United States Patent
Yamashita et al.

(10) Patent No.: US 11,742,485 B2
(45) Date of Patent: *Aug. 29, 2023

(54) POSITIVE-ELECTRODE ACTIVE MATERIAL FOR SECONDARY CELL, AND METHOD FOR MANUFACTURING THE SAME

(71) Applicant: TAIHEIYO CEMENT CORPORATION, Tokyo (JP)

(72) Inventors: Hiroki Yamashita, Sakura (JP); Tomoki Hatsumori, Sakura (JP); Takaaki Ogami, Sakura (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 152 days.

This patent is subject to a terminal disclaimer.

(21) Appl. No.: 16/515,489

(22) Filed: Jul. 18, 2019

(65) Prior Publication Data

US 2019/0348680 A1   Nov. 14, 2019

Related U.S. Application Data

(62) Division of application No. 15/514,217, filed as application No. PCT/JP2015/076084 on Sep. 15, 2015, now Pat. No. 10,461,330.

(30) Foreign Application Priority Data

Sep. 26, 2014 (JP) .................................. 2014-197025
Jun. 9, 2015 (JP) .................................. 2015-116284

(51) Int. Cl.
*H01M 4/00* (2006.01)
*H01M 4/58* (2010.01)
(Continued)

(52) U.S. Cl.
CPC ........... *H01M 4/5825* (2013.01); *C01B 25/45* (2013.01); *C01B 33/20* (2013.01); *C01B 33/32* (2013.01);
(Continued)

(58) Field of Classification Search
CPC .. H01M 4/5825; H01M 4/1397; H01M 4/625; H01M 4/136; H01M 4/0471;
(Continued)

(56) References Cited

U.S. PATENT DOCUMENTS 10,461,330 B2 * 10/2019 Yamashita .......... H01M 4/5825
10,868,295 B2 * 12/2020 Yamashita ............ H01M 4/131
(Continued)

FOREIGN PATENT DOCUMENTS

JP   2001-15111 A   1/2001
JP   2008-260666 A   10/2008
(Continued)

OTHER PUBLICATIONS

Muraliganth, T., K. R. Stroukoff, and Arumugam Manthiram. "Microwave-solvothermal synthesis of nanostructured Li2MSiO4/C (M=Mn and Fe) cathodes for lithium-ion batteries." Chemistry of Materials 22.20 (2010): 5754-5761. (Year: 2010).*

(Continued)

*Primary Examiner* — Nicholas P D'Aniello
(74) *Attorney, Agent, or Firm* — Oblon, McClelland, Maier & Neustadt, L.L.P.

(57) ABSTRACT

The present invention provides a positive-electrode active material for a lithium-ion secondary cell or a sodium-ion secondary cell, which can effectively exhibit more excellent charge/discharge characteristics; and a method for manufacturing the positive-electrode active material. Namely, the present invention relates to a positive-electrode active material for a secondary cell comprising an oxide represented by (Continued)

formula (A): $LiFe_aMn_bM_cPO_4$, formula (B): $LiFe_aMn_bM_cSiO_4$, or formula (C): $NaFe_gMn_hQ_iPO_4$; and carbon derived from a cellulose nanofiber supported thereon.

7 Claims, 3 Drawing Sheets

(51) Int. Cl.

| | |
|---|---|
| H01M 4/1397 | (2010.01) |
| C01B 33/20 | (2006.01) |
| H01M 4/62 | (2006.01) |
| H01M 4/136 | (2010.01) |
| C01B 25/45 | (2006.01) |
| C01B 33/32 | (2006.01) |
| D01F 9/16 | (2006.01) |
| H01M 4/04 | (2006.01) |
| H01M 4/36 | (2006.01) |
| H01M 4/587 | (2010.01) |
| H01M 10/0525 | (2010.01) |
| H01M 10/054 | (2010.01) |
| H01M 4/02 | (2006.01) |

(52) U.S. Cl.
CPC ............ *D01F 9/16* (2013.01); *H01M 4/0471* (2013.01); *H01M 4/136* (2013.01); *H01M 4/1397* (2013.01); *H01M 4/364* (2013.01); *H01M 4/366* (2013.01); *H01M 4/587* (2013.01); *H01M 4/625* (2013.01); *H01M 10/054* (2013.01); *H01M 10/0525* (2013.01); *C01P 2002/82* (2013.01); *C01P 2004/04* (2013.01); *C01P 2006/40* (2013.01); *H01M 2004/028* (2013.01)

(58) Field of Classification Search
CPC ...... H01M 4/364; H01M 4/366; H01M 4/587; H01M 10/0525; H01M 10/054; H01M 4/62; H01M 2004/028; C01B 33/20; C01B 25/45; C01B 33/32; D01F 9/16; C01P 2002/82; C01P 2004/04; C01P 2006/40; Y02E 60/10
See application file for complete search history.

(56) References Cited

U.S. PATENT DOCUMENTS

| | | | |
|---|---|---|---|
| 2009/0309072 A1 | 12/2009 | Hwang et al. | |
| 2011/0136014 A1 | 6/2011 | Kay | |
| 2012/0003540 A1 | 1/2012 | Nakano et al. | |
| 2012/0091405 A1* | 4/2012 | Yamakaji | B29B 9/12 |
| | | | 252/519.33 |
| 2012/0258359 A1 | 10/2012 | Saka | |
| 2013/0281464 A1 | 10/2013 | Miyake et al. | |
| 2015/0056517 A1* | 2/2015 | Zhou | H01M 4/136 |
| | | | 429/310 |
| 2018/0053929 A1* | 2/2018 | Yamashita | H01M 4/1397 |

FOREIGN PATENT DOCUMENTS

| | | | |
|---|---|---|---|
| JP | 2010-251302 A | | 11/2010 |
| JP | 2011-34963 A | | 2/2011 |
| JP | 2011-76931 A | | 4/2011 |
| JP | 2011-134550 A | | 7/2011 |
| JP | 2014-55085 A | | 3/2014 |
| JP | 2014-91657 A | | 5/2014 |
| JP | 2014-96345 A | | 5/2014 |
| JP | 2014-201459 A | | 10/2014 |
| JP | 2014241229 A | * | 12/2014 |
| WO | 2012/074040 A1 | | 6/2012 |

OTHER PUBLICATIONS

Belharouak, Ilias, A. Abouimrane, and K. Amine. "Structural and electrochemical characterization of Li2MnSiO4 cathode material." The Journal of Physical Chemistry C 113.48 (2009): 20733-20737. (Year: 2009).*
English machine translation of JP 2014-091657 A (Year: 2014).*
Machine translation of JP-2014241229-A, obtained Oct. 2021 (Year: 2014).*
International Search Report dated Dec. 28, 2015 in PCT/JP2015/07608 filed Sep. 15, 2015.

* cited by examiner

[Figure 1]
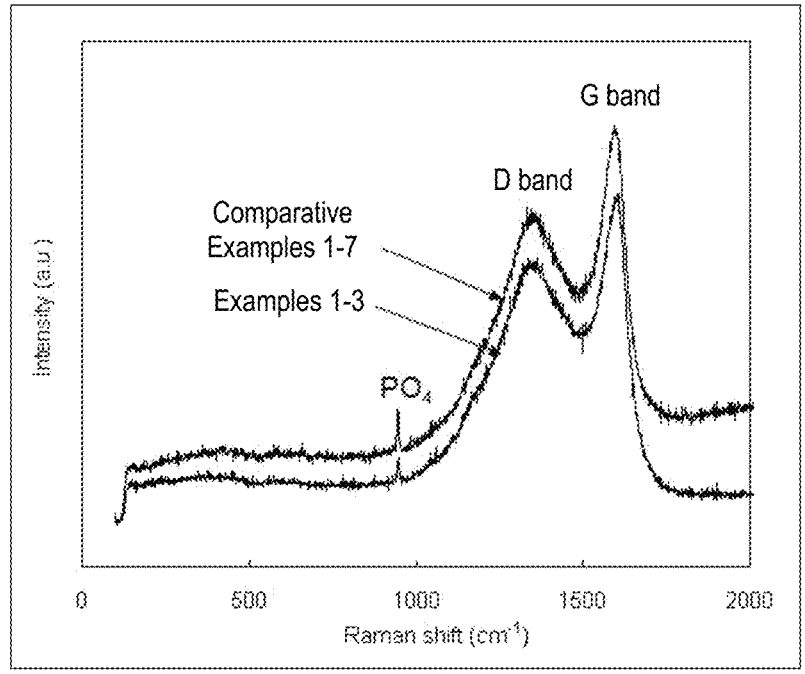
[Figure 2]
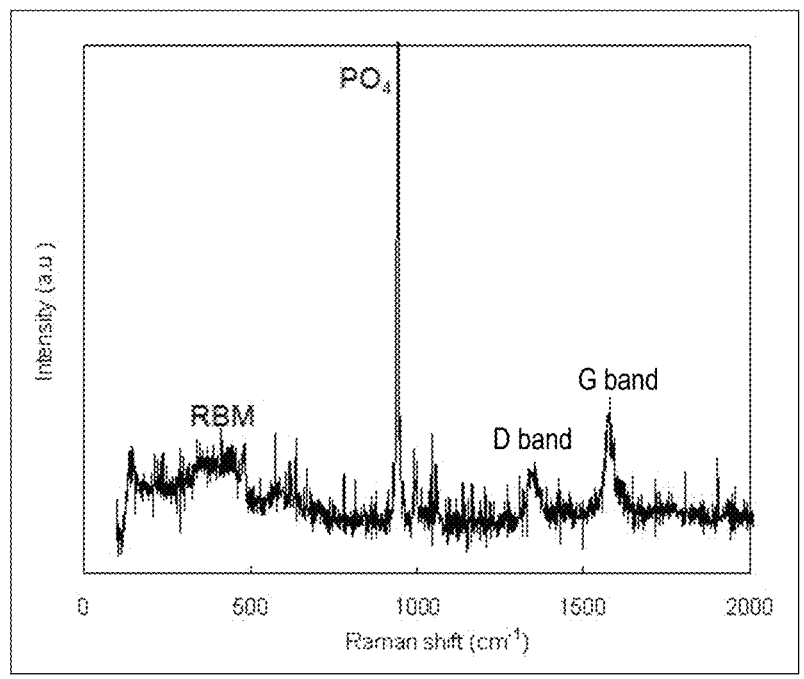

[Figure 3]
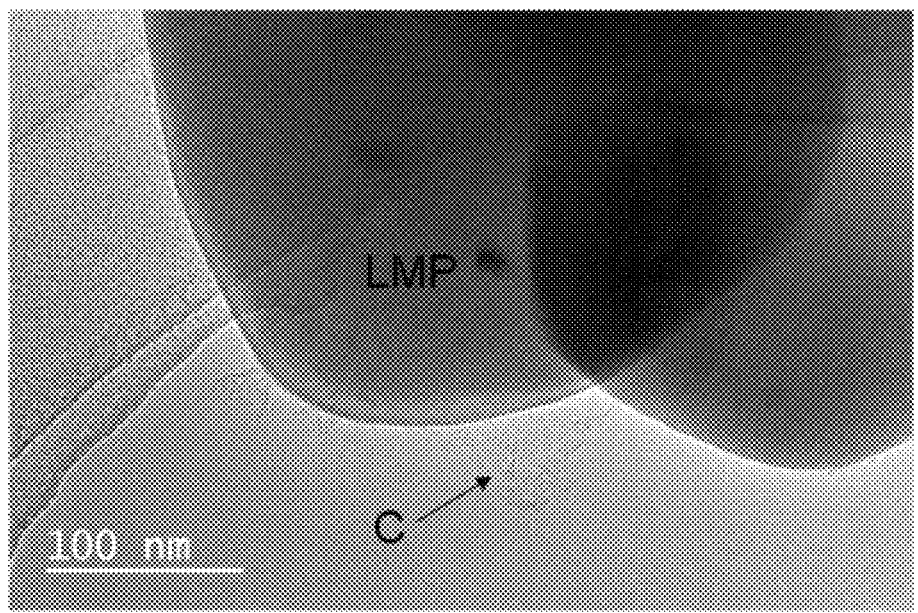
[Figure 4]
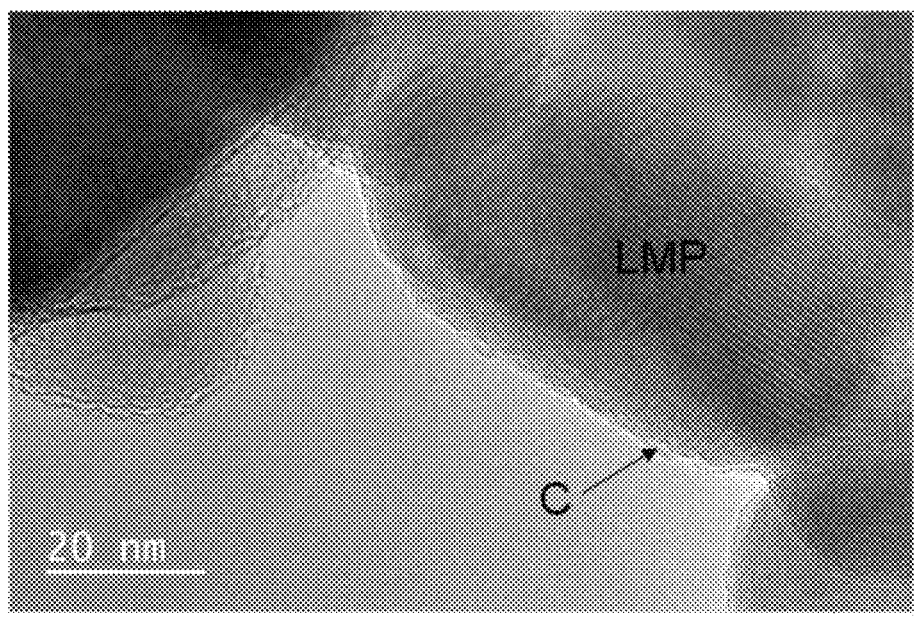

[Figure 5]
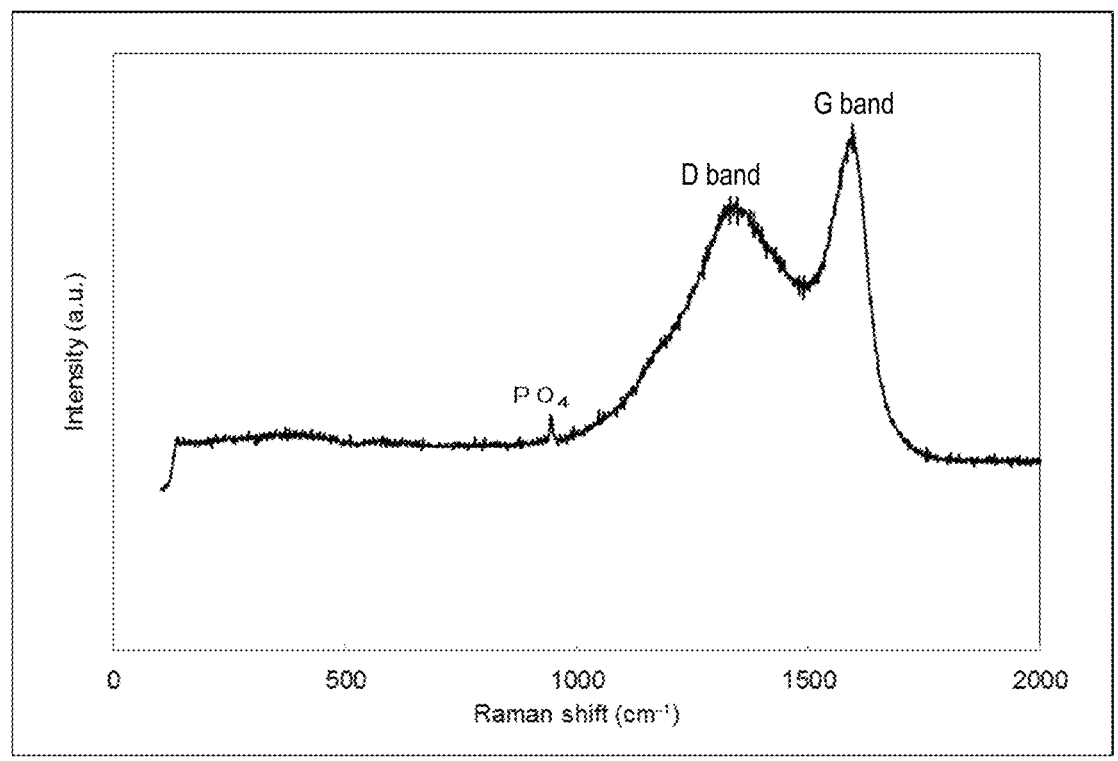

POSITIVE-ELECTRODE ACTIVE MATERIAL FOR SECONDARY CELL, AND METHOD FOR MANUFACTURING THE SAME

CROSS REFERENCE TO RELATED APPLICATIONS

This application is a divisional of U.S. application Ser. No. 15/514,217, filed on Mar. 24, 2017, which is a National Stage entry under 35 USC 371 of PCT/JP2015/076084, filed on Sep. 15, 2015, the text of which is incorporated herein by reference, and claims priority to JP 2015-116284, filed on Jun. 9, 2015, and JP 2014-197025, filed on Sep. 26, 2014, the entire contents of which are incorporated herein by reference.

FIELD OF THE INVENTION

The present invention relates to a positive-electrode active material for a secondary cell having carbon supported, and a method for manufacturing the material.

BACKGROUND OF THE INVENTION

Secondary cells for use in, e.g., portable electronic devices, hybrid vehicles and electric vehicles have been developed, in particular, lithium-ion secondary cells are widely known. In the circumstances, lithium-containing olivine-type metal phosphate such as $Li(Fe,Mn)PO_4$, which are compounds not greatly influenced by resource limitation and exhibit high safety, is suitably used as positive electrode materials for obtaining high-power and large-capacity lithium secondary cells. However, these compounds have characteristics derived from crystal structures, based on which it is difficult to sufficiently enhance conductivity. In addition, there is still room for improvement in diffusivity of a lithium ion. Accordingly, various developments have conventionally been made.

For example, in Patent Literature 1, the lithium ion diffusion distance in an olivine-type positive electrode active material is shortened by forming a primary crystal particle as an ultrafine particle, to be tried to improve performance of the electric cell to be obtained. In Patent Literature 2, a conductive carbonaceous material is uniformly deposited onto the surface of a particle of a positive electrode active material to obtain a regular electric field distribution on the particle surface. In this manner, high power generation of the electric cell is tried to attain.

In the case where the surface of a particle of a positive electrode active material is coated with carbon, the amount of lithium atoms passing through the carbon film is limited, with the result that it is difficult to enhance charge/discharge characteristics against intention. To avoid this phenomenon, Patent Literature 3 discloses a method of coating the surface of a particle of a positive electrode active material with a carbon nanostructure such as a carbon nanotube and nanographene by plasma decomposition of an organic compound.

Patent Literature 4 discloses, as a technique for improving physical properties of an electric cell by enhancing the binding property between an electrode active material and a conductive aid, a slurry composition for electrode, containing an electrode active material, a conductive aid and a cellulose fiber as an aqueous binder. The slurry is applied onto an electrode current collector and dried to form an electrode active material layer.

Since lithium is a rare and valuable substance, investigation on e.g., a sodium-ion secondary cell using sodium in place of a lithium-ion secondary cell has been started.

For example, Patent Literature 5 discloses a positive-electrode active material for a sodium secondary cell using malysite-type $NaMnPO_4$, and Patent Literature 6 discloses a positive-electrode active material containing a transition metal doped sodium phosphate having an olivine structure. Either one of the literatures discloses that a high-performance sodium-ion secondary cell can be obtained.

CITATION LIST

Patent Literatures

[Patent Literature 1] JP-A-2010-251302
[Patent Literature 2] JP-A-2001-15111
[Patent Literature 3] JP-A-2011-76931
[Patent Literature 4] WO-A-2012/074040
[Patent Literature 5] JP-A-2008-260666
[Patent Literature 6] JP-A-2011-34963

SUMMARY OF THE INVENTION

Technical Problem

However, the method using plasma degradation as described in Patent Literature 3 above requires special equipment and technology. Thus, it is still desirable to obtain a positive-electrode active material exhibiting excellent charge/discharge characteristics by a simple means as disclosed Patent Literatures 1 and 2. In the circumstances, in order to enhance battery characteristics, while a cellulose fiber as described in Patent Literature 4 can be used as a carbon source, a positive-electrode active material comprising the cellulose fiber supported has not yet been known. Even specific investigation on whether such a positive-electrode active material can be obtained by a simple means has not yet been made.

Also, concerning the positive-electrode active materials for a sodium-ion secondary cell described in Patent Literatures 5 and 6, it is desired to realize a more useful sodium-ion secondary cell.

In any one of the positive-electrode active materials, as the amount of carbon source to be supported increases, rate characteristics of the positive-electrode active material increases. Meanwhile the ratio of the positive-electrode material in the positive-electrode active material reduces, with the result that the electric capacitance tends to reduce. In order to ensure both rate characteristics and electric capacitance having a trade-off relationship at high levels, it is now desired to develop a new technology for realizing satisfactory rate characteristics even if the amount of carbon source to be supported reduces.

Therefore, an object of the present invention is to provide a positive-electrode active material for a lithium-ion secondary cell or a positive-electrode active material for sodium-ion secondary cells, which can effectively exhibit more excellent charge/discharge characteristics, and a method for manufacturing the positive-electrode active material.

Solution to Problem

Then, the present inventors conducted studies and found that a positive-electrode active material comprising an oxide represented by a particular formula, and carbon derived from a cellulose nanofiber supported thereon can provide a secondary cell having a large charge/discharge capacity. Based on the finding, the present invention was accomplished.

Namely, the present invention provides a positive-electrode active material for a secondary cell, comprising an oxide represented by the following formula (A), (B) or (C):

$$LiFe_aMn_bM_cPO_4 \qquad (A)$$

in formula (A), M represents Mg, Ca, Sr, Y, Zr, Mo, Ba, Pb, Bi, La, Ce, Nd or Gd; and a, b and c represent numbers satisfying $0 \leq a \leq 1$, $0 \leq b \leq 1$, $0 \leq c \leq 0.2$, $2a+2b+(\text{valence of } M) \times c = 2$ and $a+b \neq 0$;

$$Li_2Fe_dMn_eN_fSiO_4 \qquad (B)$$

in formula (B), N represents Ni, Co, Al, Zn, V or Zr; d, e and f represent numbers satisfying $0 \leq d \leq 1$, $0 \leq e \leq 1$, $0 \leq f < 1$, $2d+2e+(\text{valence of } N) \times f = 2$ and $d+e \neq 0$;

$$NaFe_gMn_hQ_iPO_4 \qquad (C)$$

in formula (C), Q represents Mg, Ca, Co, Sr, Y, Zr, Mo, Ba, Pb, Bi, La, Ce, Nd or Gd; g, h and i represent numbers satisfying $0 \leq g \leq 1$, $0 \leq h \leq 1$, $0 \leq i < 1$, $2g+2h+(\text{valence of } Q) \times i = 2$ and $g+h \neq 0$; and carbon derived from a cellulose nanofiber supported on the oxide.

The present invention further provides a method for manufacturing a positive-electrode active material for a secondary cell, comprising an oxide represented by the following formula (A), (B) or (C):

$$LiFe_aMn_bM_cPO_4 \qquad (A)$$

in formula (A), M represents Mg, Ca, Sr, Y, Zr, Mo, Ba, Pb, Bi, La, Ce, Nd or Gd; and a, b and c represent numbers satisfying $0 \leq a \leq 1$, $0 \leq b \leq 1$, $0 \leq c \leq 0.2$, $2a+2b+(\text{valence of } M) \times c = 2$ and $a+b \neq 0$;

$$Li_2Fe_dMn_eN_fSiO_4 \qquad (B)$$

in formula (B), N represents Ni, Co, Al, Zn, V or Zr; d, e and f represent numbers satisfying $0 \leq d \leq 1$, $0 \leq e \leq 1$, $0 \leq f < 1$, $2d+2e+(\text{valence of } N) \times f = 2$ and $d+e \neq 0$;

$$NaFe_gMn_hQ_iPO_4 \qquad (C)$$

in formula (C), Q represents Mg, Ca, Co, Sr, Y, Zr, Mo, Ba, Pb, Bi, La, Ce, Nd or Gd; g, h and i represent numbers satisfying $0 \leq g \leq 1$, $0 \leq h \leq 1$, $0 \leq i < 1$, $2g+2h+(\text{valence of } Q) \times i = 2$ and $g+h \neq 0$; and carbon derived from a cellulose nanofiber supported on the oxide, the method comprising step (I) of mixing a phosphoric acid compound or a silicic acid compound with slurry X comprising a lithium compound or a sodium compound and a cellulose nanofiber to obtain composite X, step (II) of subjecting the composite X obtained and slurry Y comprising a metal salt comprising at least an iron compound or a manganese compound to a hydrothermal reaction to obtain composite Y, and step (III) of pyrolyzing the composite Y obtained in a reducing atmosphere or an inert atmosphere.

The present invention further provides a method for manufacturing a positive-electrode active material for a secondary cell, comprising an oxide represented by the following formula (A), (B) or (C):

$$LiFe_aMn_bM_cPO_4 \qquad (A)$$

in formula (A), M represents Mg, Ca, Sr, Y, Zr, Mo, Ba, Pb, Bi, La, Ce, Nd or Gd; and a, b and c represent numbers satisfying $0 \leq a \leq 1$, $0 \leq b \leq 1$ and $0 \leq c \leq 0.3$, a and b are not simultaneously 0, and $2a+2b+(\text{valence of } M) \times c = 2$ is satisfied;

$$LiFe_aMn_bM_cSiO_4 \qquad (B)$$

in formula (B), M represents Mg, Ca, Sr, Y, Zr, Mo, Ba, Pb, Bi, La, Ce, Nd or Gd; a, b and c represent numbers satisfying $0 \leq a \leq 1$, $0 \leq b \leq 1$ and $0 \leq c \leq 0.3$, a and b are not simultaneously 0, and $2a+2b+(\text{valence of } M) \times c = 2$ is satisfied;

$$NaFe_gMn_hQ_iPO_4 \qquad (C)$$

in formula (C), Q represents Mg, Ca, Co, Sr, Y, Zr, Mo, Ba, Pb, Bi, La, Ce, Nd or Gd; g, h and i represent numbers satisfying $0 \leq g \leq 1$, $0 \leq h \leq 1$, $0 \leq i < 1$, $2g+2h+(\text{valence of } Q) \times i = 2$ and $g+h \neq 0$; and carbon derived from a cellulose nanofiber supported on the oxide, the method comprising step (I') of mixing slurry Q comprising an oxide obtained by a synthetic reaction with slurry R comprising a cellulose nanofiber to obtain slurry S, step (II') of subjecting the slurry S obtained to spray drying, thereby obtaining granule S, and step (III') of pyrolyzing granule S obtained in a reducing atmosphere or an inert atmosphere.

Effects of Invention

According to the positive-electrode active material for a secondary cell of the present invention, carbon derived from a cellulose nanofiber is firmly supported as carbonized carbon to an oxide represented by the above particular formula, which is a lithium-containing olivine-type metal phosphate, lithium-containing olivine-type metal silicate or a sodium-containing olivine-type metal phosphate. Accordingly, even though the positive-electrode active material for a secondary cell can be obtained by such a simple method, it sufficiently contributes to improvement in performance of a lithium-ion secondary cell or a sodium-ion secondary cell.

The high performance of a lithium-ion secondary cell or sodium-ion secondary cell can be maintained while sufficiently reducing the amount of carbon to be supported.

BRIEF DESCRIPTION OF DRAWINGS

FIG. 1 shows Raman spectra obtained by subjecting the positive-electrode active materials for a lithium-ion secondary cell of Example 1-3 and Comparative Example 1-7 to Raman spectral analysis. The vertical axis represents the intensity (a. u.) and the horizontal axis represents the Raman shift ($cm^{-1}$).

FIG. 2 shows a Raman spectrum obtained by subjecting the positive-electrode active material for the lithium-ion secondary cell of Comparative Example 1-6 to Raman spectral analysis. The vertical axis represents the intensity (a. u.) and the horizontal axis represents the Raman shift ($cm^{-1}$).

FIG. 3 shows a TEM image in the vicinity of the surface of the positive-electrode active material for the lithium-ion secondary cell according to Example 1-3.

FIG. 4 shows a TEM image in the vicinity of the surface of the positive-electrode active material for the lithium-ion secondary cell according to Comparative Example 1-3.

FIG. 5 shows Raman spectra obtained by subjecting the positive-electrode active materials for a lithium-ion secondary cell of Comparative Example 2-3 to Raman spectral analysis. The vertical axis represents the intensity (a. u.) and the horizontal axis represents the Raman shift ($cm^{-1}$).

DETAILED DESCRIPTION OF THE INVENTION

Hereinafter, the present invention will be more specifically described.

The oxide to be used in the present invention is represented by the following formula (A), (B) or (C):

$$LiFe_aMn_bM_cPO_4 \quad (A)$$

in formula (A), M represents Mg, Ca, Sr, Y, Zr, Mo, Ba, Pb, Bi, La, Ce, Nd or Gd; and a, b and c represent numbers satisfying $0 \le a \le 1$, $0 \le b \le 1$, $0 \le c \le 0.2$, $2a+2b+(\text{valence of } M) \times c = 2$ and $a+b \ne 0$, $$Li_2Fe_dMn_eN_fSiO_4 \quad (B)$$

in formula (B), N represents Ni, Co, Al, Zn, V or Zr; d, e and f represent numbers satisfying $0 \le d \le 1$, $0 \le e \le 1$, $0 \le f < 1$, $2d+2e+(\text{valence of } N) \times f = 2$ and $d+e \ne 0$, $$NaFe_gMn_hQ_iPO_4 \quad (C)$$

in formula (C), Q represents Mg, Ca, Co, Sr, Y, Zr, Mo, Ba, Pb, Bi, La, Ce, Nd or Gd; g, h and i represent numbers satisfying $0 \le g \le 1$, $0 \le h \le 1$, $0 \le i < 1$, $2g+2h+(\text{valence of } Q) \times i = 2$ and $g+h \ne 0$.

Any one of these oxides has an olivine structure and comprises at least iron or manganese. If an oxide represented by the above formula (A) or formula (B) is used, a positive-electrode active material for a lithium-ion secondary cell is obtained, while if an oxide represented by the above formula (C) is used, a positive-electrode active material for a sodium-ion secondary cell can be obtained.

An oxide represented by the above formula (A) is a so-called olivine-type transition metal-containing lithium phosphate compound comprising at least iron (Fe) and manganese (Mn) as a transition metal. In formula (A), M represents Mg, Ca, Sr, Y, Zr, Mo, Ba, Pb, Bi, La, Ce, Nd or Gd and preferably Mg, Zr, Mo or Co; a satisfies $0 \le a \le 1$, preferably $0.01 \le a \le 0.99$ and more preferably $0.1 \le a \le 0.9$; b satisfies $0 \le b \le 1$, preferably $0.01 \le b \le 0.99$ and more preferably $0.1 \le b \le 0.9$; c satisfies $0 \le c \le 0.2$ and preferably $0 \le c \le 0.1$; and a, b and c are numbers satisfying $2a+2b+(\text{valence of } M) \times c = 2$ and $a+b \ne 0$. Specifically, examples of the olivine-type transition-metal containing lithium phosphate compound represented by the above formula (A) include $LiFe_{0.9}Mn_{0.1}PO_4$, $LiFe_{0.2}Mn_{0.8}PO_4$, $LiFe_{0.15}Mn_{0.75}Mg_{0.1}PO_4$ and $LiFe_{0.19}Mn_{0.75}Zr_{0.03}PO_4$. Of them, $LiFe_{0.2}Mn_{0.8}PO_4$ is preferable.

An oxide represented by the above formula (B) is a so-called olivine-type transition-metal containing lithium silicate compound comprising at least iron (Fe) and manganese (Mn) as a transition metal. In formula (B), N represents Ni, Co, Al, Zn, V or Zr and preferably Co, Al, Zn, V or Zr; d satisfies $0 \le d \le 1$, preferably $0 \le d < 1$ and more preferably $0.1 \le d \le 0.6$; e satisfies $0 \le e \le 1$, preferably $0 \le e < 1$ and more preferably $0.1 \le e \le 0.6$; f satisfies $0 \le f < 1$, preferably $0 < f < 1$, more preferably $0.05 \le f \le 0.4$; and d, e and f are numbers satisfying $2d+2e+(\text{valence of } N) \times f = 2$ and $d+e \ne 0$. Specifically, examples of the olivine-type transition-metal containing lithium silicate compound represented by the above formula (B) include $Li_2Fe_{0.45}Mn_{0.45}Co_{0.1}SiO_4$, $Li_2Fe_{0.36}Mn_{0.54}Al_{0.066}SiO^4$, $Li_2Fe_{0.45}Mn_{0.45}Zn_{0.1}SiO_4$, $Li_2Fe_{0.36}Mn_{0.54}V_{0.066}SiO_4$ and $Li_2Fe_{0.282}Mn_{0.658}Zr_{0.02}SiO_4$. Of them, $Li_2Fe_{0.282}Mn_{0.658}Zr_{0.02}SiO_4$ is preferable.

An oxide represented by the above formula (C) is a so-called olivine-type transition-metal containing sodium phosphate compound comprising at least iron (Fe) and manganese (Mn) as a transition metal. In formula (C), Q represents Mg, Ca, Co, Sr, Y, Zr, Mo, Ba, Pb, Bi, La, Ce, Nd or Gd and preferably Mg, Zr, Mo or Co; g satisfies $0 \le g \le 1$ and preferably $0 < g \le 1$; h satisfies $0 \le h \le 1$ and preferably $0.5 \le h < 1$; i satisfies $0 \le i < 1$, preferably $0 \le i \le 0.5$ and more preferably $0 \le i \le 0.3$; and g, h and i are numbers satisfying $0 \le g \le 1$, $0 \le h \le 1$ and $0 \le i < 1$, $2g+2h+(\text{valence of } Q) \times i = 2$ and $g+h \ne 0$. Specifically, examples of the olivine-type transition-metal containing sodium phosphate compound represented by the above formula (C) include $NaFe_{0.9}Mn_{0.1}PO_4$, $NaFe_{0.2}Mn_{0.8}PO_4$, $NaFe_{0.15}Mn_{0.7}Mg_{0.15}PO_4$, $NaFe_{0.19}Mn_{0.75}Zr_{0.03}PO_4$, $NaFe_{0.19}Mn_{0.75}Mo_{0.03}PO_4$ and $NaFe_{0.15}Mn_{0.7}Co_{0.15}PO_4$. Of them, $NaFe_{0.2}Mn_{0.8}PO_4$ is preferable.

The positive-electrode active material for a secondary cell of the present invention comprises an oxide represented by the above formula (A), (B) or (C) and carbon derived from a cellulose nanofiber supported thereon. The cellulose nanofiber is carbonized into carbon, and the carbon is firmly supported on the oxide. The cellulose nanofiber is a skeleton component occupying about 50% of the plant cell-wall and is a lightweight high-strength fiber obtained by, e.g., defiberizing a plant fiber constituting the cell-wall into a nano-size fiber. Such cellulose nanofiber has a diameter of 1 to 1,000 nm and also has a satisfactory water dispersibility. Further, in a cellulose molecular chain constituting the cellulose nanofiber, a periodic structure of carbon atoms is formed. Accordingly, if the cellulose nanofiber is carbonized and firmly supported on the oxide, it is possible to obtain a positive electrode active material useful for enhancing the performance of the cell to be obtained.

Then, a cellulose nanofiber is present in the positive-electrode active material for a secondary cell of the present invention as a carbon derived from the cellulose nanofiber carbonized and supported on the oxide. The content of carbon (in terms of carbon atom) derived from a cellulose nanofiber and supported on an oxide, as a carbonized carbon in the positive-electrode active material for a secondary cell of the present invention, is preferably 0.3 to 20 mass %, more preferably 0.4 to 15 mass % and further preferably 0.5 to 10 mass %. More specifically, if a phosphoric acid compound is used, for example, in step (I) described later, the content of a cellulose nanofiber in terms of carbon atom in the positive-electrode active material for a secondary cell of the present invention is preferably 0.3 to 15 mass %, more preferably 0.4 to 10 mass % and further preferably 0.5 to 7 mass %. If a silicic acid compound is used, the content of a cellulose nanofiber in terms of carbon atom in the positive-electrode active material for a secondary cell of the present invention is preferably 0.5 to 20 mass %, more preferably 0.6 to 15 mass % and further preferably 0.7 to 10 mass %.

More specifically, as is described later, if the positive-electrode active material for a secondary cell of the present invention is, for example, a positive-electrode active material for a secondary cell (H), which is a product obtained by pyrolyzing composite Y under a reducing atmosphere or under an inert atmosphere, in which the composite Y is a product of a hydrothermal reaction between composite X derived from a mixture of slurry X comprising a lithium compound or a sodium compound and a cellulose nanofiber, and a phosphoric acid compound or a silicic acid compound, and slurry Y comprising a metal salt comprising at least an iron compound or a manganese compound, the content of carbon (in terms of atom) derived from a cellulose nanofiber and supported on an oxide in the positive-electrode active material for a secondary cell of the present invention, is preferably 0.5 to 20 mass %, more preferably 1 to 15 mass % and further preferably 1.5 to 10 mass %. More specifically, if a phosphoric acid compound is used, for example, in step (I) described later, the content of carbon (in terms of atom) derived from a cellulose nanofiber in the positive-electrode active material for a secondary cell of the present invention is preferably 0.5 to 15 mass %, more preferably 1 to 10 mass % and further preferably 1.5 to 7 mass %. If a silicic acid compound is used, the content of carbon (in terms of atom) derived from a cellulose nanofiber in the positive-electrode active material for a secondary cell of the present invention is preferably 1 to 20 mass %, more preferably 1.5 to 15 mass % and further preferably 2 to 10 mass %.

More specifically, as is described later, if the positive-electrode active material for a secondary cell of the present invention is, for example, a positive-electrode active material for a secondary cell (H'), which is a product obtained by pyrolyzing granule S, which is a granulated material of an oxide, which is a product of a synthetic reaction of a lithium compound or a sodium compound, a phosphoric acid compound or a silicic acid compound and a metal salt comprising at least an iron compound or a manganese compound, and a cellulose nanofiber, under a reducing atmosphere or under an inert atmosphere, the content of carbon (in terms of atom) derived from a cellulose nanofiber and supported on an oxide in the positive-electrode active material for a secondary cell of the present invention is preferably 0.3 to 6 mass %, more preferably 0.4 to 3 mass % and further preferably 0.5 to 1.5 mass %. More specifically, if a phosphoric acid compound is used, for example, in step (I') described later, the content of carbon (in terms of atom) derived from a cellulose nanofiber in the positive-electrode active material for a secondary cell of the present invention is preferably 0.3 to 4 mass %, more preferably 0.4 to 2.5 mass % and further preferably 0.5 to 1.2 mass %. If a silicic acid compound is used, the content of carbon (in terms of atom) derived from a cellulose nanofiber in the positive-electrode active material for a secondary cell of the present invention is preferably 0.5 to 5 mass %, more preferably 0.6 to 4 mass % and further preferably 0.7 to 3 mass %.

Note that the content of carbon (in terms of atom) derived from a cellulose nanofiber and present in the positive-electrode active material for a secondary cell can be obtained by measurement using a carbon/sulfur analyzer.

The carbon derived from a cellulose nanofiber is present as carbon carbonized and is characterized by the crystallinity. Therefore, the characteristic crystallinity can be confirmed by analysis of carbon supported on the positive-electrode active material for a secondary cell of the present invention, by Raman spectroscopy.

Specifically, in the Raman spectrum obtained by Raman spectroscopy of carbon derived from a cellulose nanofiber and supported on the positive-electrode active material for a secondary cell of the present invention, the intensity ratio of D band (peak position: near 1350 $cm^{-1}$) and G band (peak position: near 1590 $cm^{-1}$) (G/D) is preferably 0.5 to 1.8 and more preferably 0.8 to 1.3. The intensity ratio of the peak attributed to $PO_4^{3-}$ (peak position: near 950 $cm^{-1}$) and G band ($PO_4$/G), or the intensity ratio of the peak attributed to $SiO_4^{4-}$ (peak position: near 840 $cm^{-1}$) and G band, ($SiO_4$/G) is preferably 0.01 to 0.10 and more preferably 0.03 to 0.08.

For example, if carbon supported on the positive-electrode active material for a secondary cell is carbon derived from a carbon nanotube, the intensity ratio (G/D) obtained by Raman spectroscopy is about 2 to 9. If carbon supported on the positive-electrode active material for a secondary cell is carbon derived from a carbon nanotube, an RBM (Radial Breathing Mode) peak is present at 100 to 350 $cm^{-1}$ in the Raman spectrum. In contrast, in the Raman spectrum of carbon derived from a cellulose nanofiber and supported on the positive-electrode active material for a secondary cell of the present invention, an RBM peak is not observed.

Meanwhile, in the case where carbon derived from a general cellulose fiber having a diameter more than 1000 nm is carbonized and supported on a positive-electrode active material for a secondary cell, the intensity ratio (G/D) in the Raman spectrum is 0.5 to 1.8, which is equivalent to the value in the case where carbon derived from a cellulose nanofiber is supported on a positive-electrode active material for a secondary cell. The intensity ratio ($PO_4$/G) or intensity ratio ($SiO_4$/G) is about 0.11 to 0.25, which differs from the value in the case where carbon derived from a cellulose nanofiber is supported on the positive-electrode active material.

The positive-electrode active material for a secondary cell of the present invention has a characteristic composite structure showing a Raman spectrum which is completely different from the case where carbon derived from a carbon nanotube or a general cellulose supported on a positive-electrode active material. Due to the composite structure, the positive-electrode active material for a secondary cell of the present invention conceivably contributes to excellent charge/discharge characteristics.

Carbon derived from a cellulose nanofiber and supported on a positive-electrode active material for a secondary cell of the present invention is characterized by presenting in such a manner that it fills spaces between the oxide particles represented by the above formula (A), (B) or (C). Namely, a conventional conductive carbonaceous material as described in Patent Literature 2 is uniformly deposited on the surface of a positive electrode active material particle, whereas carbon derived from a cellulose nanofiber of the present invention is present on a part of a particle of the positive electrode active material so as to fill the spaces between particles of a packing structure formed of oxide particles.

In the positive-electrode active material for a secondary cell of the present invention, carbon having a characteristic composite structure forms a conductive path between the oxide particles in the condition that a packing density of the positive-electrode active material increases, and thus excellent charge/discharge characteristics are shown. Conceivably, it is expected that the amount of carbon can be effectively reduced.

It is preferable that the positive-electrode active material for a secondary cell of the present invention is a positive-electrode active material for a secondary cell (H), in which the positive-electrode active material is a product obtained by pyrolyzing composite Y under a reducing atmosphere or under an inert atmosphere, in which the composite Y is a product of a hydrothermal reaction between composite X derived from a mixture of slurry X comprising a lithium compound or a sodium compound and a cellulose nanofiber, and a phosphoric acid compound or a silicic acid compound, and slurry Y comprising a metal salt comprising at least an iron compound or a manganese compound; or a positive-electrode active material for a secondary cell (H'), in which the positive-electrode active material is a product obtained by pyrolyzing granule S under a reducing atmosphere or under an inert atmosphere, in which is a granulated material of an oxide, in which the granule S is a product of a synthetic reaction of a lithium compound or a sodium compound, a phosphoric acid compound or a silicic acid compound and a metal salt comprising at least an iron compound or a manganese compound, and a cellulose nanofiber.

Namely, the positive-electrode active material for a secondary cell of the present invention is preferably a positive-electrode active material for a secondary cell (H), which is obtained by pyrolyzing composite Y, which is obtained by subjecting composite X obtained by mixing a phosphoric acid compound or a silicic acid compound with slurry X comprising a lithium compound or a sodium compound and a cellulose nanofiber, and slurry Y comprising a metal salt comprising at least an iron compound or a manganese compound to a hydrothermal reaction, under a reducing atmosphere or under an inert atmosphere; or a positive-electrode active material for a secondary cell (H'), which is obtained by pyrolyzing granule S obtained by granulating an oxide obtained by subjecting a lithium compound or a sodium compound, a phosphoric acid compound or a silicic acid compound and a metal salt comprising at least an iron compound or a manganese compound, to a synthetic reaction, and a cellulose nanofiber, under a reducing atmosphere or under an inert atmosphere.

In the case where the positive-electrode active material for a secondary cell of the present invention is a positive-electrode active material for a secondary cell (H) described above, a method for manufacturing the positive-electrode active material for a secondary cell (H) specifically includes step (I) of mixing a phosphoric acid compound or a silicic acid compound with slurry X comprising a lithium compound or a sodium compound and a cellulose nanofiber to obtain composite X, step (II) of subjecting the composite X obtained and slurry Y comprising a metal salt comprising at least an iron compound or a manganese compound to a hydrothermal reaction to obtaining composite Y, and step (III) of pyrolyzing the composite Y obtained in a reducing atmosphere or an inert atmosphere.

Step (I) is a step of mixing a phosphoric acid compound or a silicic acid compound to slurry X comprising a lithium compound or a sodium compound and a cellulose nanofiber to obtaining composite X.

Examples of the lithium compound or sodium compound include a hydroxide (for example, $LiOH \cdot H_2O$, NaOH), a carbonate, a sulfate and an acetate. Of them, a hydroxide is preferable.

The content of a lithium compound or a sodium compound in slurry X is preferably 5 to 50 parts by mass and more preferably 7 to 45 parts by mass, relative to 100 parts by mass of water. More specifically, if a phosphoric acid compound is used in step (I), the content of a lithium compound or a sodium compound in mixture X is preferably 5 to 50 parts by mass and more preferably 10 to 45 parts by mass, relative to 100 parts by mass of water. If a silicic acid compound is used, the content of a lithium compound in mixture X is preferably 5 to 40 parts by mass and more preferably 7 to 35 parts by mass, relative to 100 parts by mass of water.

The cellulose nanofiber is not particularly limited as long as it is obtained by refining process of a plant fiber constituting the cell wall of a plant to a fiber in the order of nano-size. For example, a commercially available product such as CELISH KY-100S (manufactured by DAICEL FINECHEM LTD.) can be used. The diameter of a cellulose nanofiber is preferably 1 to 1000 nm and more preferably 1 to 500 nm in view of firm supporting to a lithium-containing olivine-type metal phosphate.

The content of a cellulose nanofiber in slurry X desirably falls within 0.5 to 20 mass % in terms of carbon atom, in the positive-electrode active material for a secondary cell of the present invention. Specifically, the content of a cellulose nanofiber in terms of residual amount in a carbonization process is preferably e.g., 0.2 to 10.6 parts by mass, more preferably 0.5 to 8 parts by mass and further preferably 0.8 to 5.3 parts by mass, relative to 100 parts by mass of water. More specifically, if a phosphoric acid compound is used in step (I), the content of a cellulose nanofiber in terms of residual amount in a carbonization process is preferably 0.2 to 8 parts by mass, more preferably 0.5 to 5.3 parts by mass and further preferably 0.8 to 3.5 parts by mass, relative to 100 parts by mass of water. If a silicic acid compound is used, the content of a cellulose nanofiber in terms of residual amount in a carbonization process is preferably 0.5 to 10.6 parts by mass, more preferably 0.8 to 8 parts by mass and further preferably 1 to 5.3 parts by mass, relative to 100 parts by mass of water.

Before a phosphoric acid compound or a silicic acid compound is mixed with slurry X, slurry X is preferably stirred in advance. The stirring time of slurry X is preferably 1 to 15 minutes and more preferably 3 to 10 minutes. The temperature of slurry X is preferably 20 to 90° C. and more preferably 20 to 70° C.

Examples of the phosphoric acid compound include ortho-phosphoric acid ($H_3PO_4$, phosphoric acid), metaphosphoric acid, pyrophosphoric acid, triphosphoric acid, tetraphosphoric acid, ammonium phosphate and ammonium hydrogen phosphate. Of them, phosphoric acid is preferably used. The phosphoric acid is preferably used as an aqueous solution having a phosphoric acid concentration of 70 to 90 mass %. In step (I), when phosphoric acid is mixed with slurry X, phosphoric acid is preferably added dropwise while stirring the slurry. If phosphoric acid is added dropwise little by little to slurry X, a reaction satisfactorily proceeds in slurry X. As a result, composite X is produced while being uniformly dispersed in the slurry and unnecessarily aggregation of composite X is effectively suppressed.

The drip rate of phosphoric acid to slurry X is preferably 15 to 50 mL/minute, more preferably 20 to 45 mL/minute and further preferably 28 to 40 mL/minute. The stirring time of slurry X while adding phosphoric acid dropwise is preferably 0.5 to 24 hours and more preferably 3 to 12 hours. The stirring speed of the slurry while adding phosphoric acid dropwise is preferably 200 to 700 rpm, more preferably 250 to 600 rpm and further preferably 300 to 500 rpm.

Note that, when slurry X is stirred, slurry X is further preferably cooled to a boiling-point temperature or less of slurry X, more specifically cooled preferably to 80° C. or less and more preferably 20 to 60° C.

The silicic acid compound is not particularly limited as long as it is a reactive silica compound. Examples thereof include amorphous silica and a sodium salt (for example, sodium metasilicate ($Na_2SiO_3$) and $Na_4SiO_4 \cdot H_2O$).

Slurry X after a phosphoric acid compound or a silicic acid compound is mixed contains lithium in an amount of preferably 2.0 to 4.0 moles and more preferably 2.0 to 3.1 moles relative to 1 mole of phosphoric acid or silicic acid. A lithium compound or a sodium compound and a phosphoric acid compound or a silicic acid compound may be used so as to satisfy the aforementioned amounts. More specifically, if a phosphoric acid compound is used in step (I), slurry X after a phosphoric acid compound is mixed contains lithium or sodium in an amount of preferably 2.7 to 3.3 moles and more preferably 2.8 to 3.1 moles relative to the phosphoric acid (1 mole). If a silicic acid compound is used in step (I), the slurry X after a silicic acid compound is mixed contains lithium in an amount of preferably 2.0 to 4.0 moles and more preferably 2.0 to 3.0 moles relative to 1 mole of silicic acid.

To slurry X after a phosphoric acid compound or a silicic acid compound is mixed, nitrogen is purged to complete the reaction in the slurry to obtain composite X, which is a precursor of an oxide represented by any one of the above formula (A) to (C), as slurry. When nitrogen is purged, a reaction is allowed to proceed at a lower dissolved oxygen concentration in slurry X. In addition, the dissolved oxygen concentration of the resultant slurry containing composite X is also effectively reduced. Therefore, oxidation of the metal salt to be added in the next step can be suppressed. In the slurry containing composite X, the precursor of an oxide represented by any one of the above formula (A) to (C) is present as a fine dispersion particle. For example, composite X, in the case where an oxide represented by the above formula (A) is used, can be obtained as a composite of tri-lithium phosphate ($Li_3PO_4$) and a cellulose nanofiber.

The pressure for purging nitrogen is preferably 0.1 to 0.2 MPa and more preferably 0.1 to 0.15 MPa. The temperature of slurry X after a phosphoric acid compound or a silicic acid compound is mixed is preferably 20 to 80° C. and more preferably 20 to 60° C. For example, in the case of an oxide represented by the above formula (A), the reaction time is preferably 5 to 60 minutes and preferably 15 to 45 minutes.

When nitrogen is purged, in view of the reaction to satisfactorily proceed, slurry X after a phosphoric acid compound or a silicic acid compound is mixed is preferably stirred. The stirring speed at this time is preferably 200 to 700 rpm and more preferably 250 to 600 rpm.

In order to more effectively suppress oxidation on a surface of a dispersed particle of composite X and to reduce the size of dispersion particles, the dissolved oxygen concentration in slurry X after a phosphoric acid compound or a silicic acid compound is mixed is preferably 0.5 mg/L or less and more preferably 0.2 mg/L or less.

Step (II) is a step of subjecting the composite X obtained in step (I) and slurry Y comprising a metal salt comprising at least an iron compound or a manganese compound to a hydrothermal reaction to obtaining composite Y. It is preferable that composite X obtained in the above step (I) as slurry is used as a precursor of an oxide represented by any one of the above formula (A) to (C). To the slurry, a metal salt comprising at least an iron compound or a manganese compound is added and the resultant mixture is preferably used as slurry Y. In this manner, a positive-electrode active material for a secondary cell, which is in the form of very fine particle and is useful as a positive-electrode active material, can be obtained.

The metal salt comprises at least an iron compound or a manganese compound and further comprises a metal (M, N or Q) salt other than the iron compound and manganese compound. Examples of the iron compound include iron acetate, iron nitrate and iron sulfate. These may be used alone or in combination of two or more. Of them, an iron sulfate is preferable in view of improvement in battery characteristics. Examples of the manganese compound include manganese acetate, manganese nitrate and manganese sulfate. These may be used alone or in combination of two or more. Of them, manganese sulfate is preferable in view of enhancement in battery characteristics.

When an iron compound and a manganese compound are used as a metal salt, the molar ratio of them (manganese compound:iron compound), is preferably 99:1 to 51:49, more preferably 95:5 to 70:30 and further preferably 90:10 to 80:20, when a lithium compound is used; and preferably 100:0 to 51:49, more preferably 100:0 to 60:40 and further preferably 100:0 to 70:30 when a sodium compound is used. The total addition amount of these metal salts relative to a phosphate ion or a silicate ion (1 mole) contained in slurry Y is preferably 0.99 to 1.01 moles and more preferably 0.995 to 1.005 moles.

A metal (M, N or Q) salt other than an iron compound and a manganese compound may be used. M, N and Q of the metal (M, N or Q) salt are the same as M, N and Q defined in the above formulas (A) to (C). As the metal salt, e.g., a sulfate, a halogen compound, an organic acid salt and a hydrate thereof may be used. These may be used alone or in combination of two or more. Of them, a sulfate is more preferably used in view of enhancement in physical properties of an electric cell.

When a metal (M, N or Q) salt is used, the total addition amount of an iron compound, a manganese compound and a metal (M, N or Q) salt relative to the phosphoric acid or 1 mole of silicic acid in the aqueous solution obtained in the above step (I) is preferably 0.99 to 1.01 moles and more preferably 0.995 to 1.005 moles.

The amount of water used to be subjected to a hydrothermal reaction relative to the phosphate or silicate ion (1 mole) in slurry Y is preferably 10 to 50 moles and more preferably 12.5 to 45 moles in view of the solubility of a metal salt, ease of stirring and the synthesis efficiency. More specifically, when the ion contained in slurry Y is a phosphate ion, the amount of water used to be subjected to a hydrothermal reaction is preferably 10 to 30 moles and more preferably 12.5 to 25 moles. When the ion contained in slurry Y is a silicate ion, the amount of water used to be subjected to a hydrothermal reaction is preferably 10 to 50 moles and more preferably 12.5 to 45 moles.

In step (II), the order of adding an iron compound, a manganese compound and a metal (M, N or Q) salt is not particularly limited. In addition to these metal salts, if necessary, an antioxidant may be added. As the antioxidant, sodium sulfite ($Na_2SO_3$), sodium hydrosulfite ($Na_2S_2O_4$), or ammonia water or the like may be used. If the addition amount of antioxidant is excessive, generation of an oxide represented any one of the above formulas (A) to (C) is suppressed. Therefore, the addition amount of antioxidant relative to the total amount (1 mole) of an iron compound, a manganese compound and an optional metal (M, N or Q) salt is preferably 0.01 to 1 mole and more preferably 0.03 to 0.5 moles.

The content of composite Y in slurry Y obtained by adding an iron compound, a manganese compound, an optional metal (M, N or Q) salt and an optional antioxidant is preferably 10 to 50 mass %, more preferably 15 to 45 mass % and further preferably 20 to 40 mass %.

The temperature of the hydrothermal reaction is preferably 100° C. or more and more preferably 130 to 180° C. The hydrothermal reaction is preferably carried out in a pressure-tight container. If the reaction is carried out at 130 to 180° C., the pressure at this time is preferably 0.3 to 0.9 MPa. If the reaction is carried out at 140 to 160° C., the pressure is preferably 0.3 to 0.6 MPa. The time of the hydrothermal reaction is preferably 0.1 to 48 hours and further preferably 0.2 to 24 hours.

The resultant composite Y is a composite comprising an oxide represented by any one of the above formulas (A) to (C) and a cellulose nanofiber, and may be isolated by filtering, washing with water and drying. As the drying means, freeze dry or vacuum drying is used.

Step (III) is a step of pyrolyzing the composite Y obtained in step (II) in a reducing atmosphere or an inert atmosphere. By this step, a cellulose nanofiber present in composite Y is carbonized into carbon, which is firmly supported on an oxide represented by any one of formulas (A) to (C) to obtain a positive-electrode active material for a secondary cell. The pyrolyzing is preferably carried out in a reducing atmosphere or an inert atmosphere at preferably 400° C. or more and more preferably 400 to 800° C., for preferably 10 minutes to 3 hours and more preferably 0.5 to 1.5 hours.

In the case where the positive-electrode active material for a secondary cell of the present invention is a positive-electrode active material for a secondary cell (H'), a method for manufacturing the positive-electrode active material for the secondary cell (H') specifically include step (I') of mixing slurry Q comprising an oxide obtained by a synthetic reaction and slurry R comprising a cellulose nanofiber, to obtain slurry S, step (II') of subjecting slurry S obtained to spray drying to obtaining granule S, and step (III') of pyrolyzing granule S obtained in a reducing atmosphere or an inert atmosphere.

Step (I') is a step of mixing slurry Q comprising an oxide represented by the above formula (A), (B) or (C) and slurry R having a cellulose nanofiber sufficiently dispersed therein, to obtain slurry S having an oxide and a cellulose nanofiber sufficiently dispersed therein.

The oxide is obtained by a synthetic reaction. Methods for carrying out synthetic reactions may be roughly classified into a solid-phase method (pyrolysis method, melt-annealing method) and a wet method (hydrothermal method), and either one of the methods may be used. The oxide after it is subjected to a synthetic reaction, may be pulverized or classified. Particularly, the oxide is preferably obtained by a hydrothermal reaction because oxide having small and uniform particle size can be obtained.

Note that a method of obtaining the oxide by a hydrothermal reaction is specifically, in the method for manufacturing a positive-electrode active material for a secondary cell (H), the same as the method of obtaining composite Y through the above step (I) and step (II), except that slurry X comprising a cellulose nanofiber is not used.

The content of the oxide in slurry Q relative to 100 parts by mass of water is preferably 10 to 400 parts by mass and more preferably 30 to 210 parts by mass.

The content of a cellulose nanofiber in slurry R desirably falls within 0.3 to 6 mass % in terms of carbon atom in the positive-electrode active material for a secondary cell of the present invention. Specifically, the content relative to 100 parts by mass of water is preferably 0.1 to 300 parts by mass and more preferably 1 to 210 parts by mass.

As the cellulose nanofiber, the same cellulose nanofiber used in the method for manufacturing a positive-electrode active material for a secondary cell (H) may be used.

From the viewpoint that slurry R sufficiently disperses the cellulose nanofiber, and in slurry S obtained, an oxide and a cellulose nanofiber are sufficiently dispersed, a disperser (homogenizer) is preferably used for the treatment to disentangle aggregated cellulose nanofibers. Examples of the disperser include a disintegrator, a beater, a low-pressure homogenizer, a high-pressure homogenizer, a grinder, a cutter mill, a ball mill, a jet mill, a short-screw extruder, a twin-screw extruder, an ultrasonic stirrer and a household juicer mixer. Of them, in view of dispersion efficiency, an ultrasonic stirrer is preferred. The homogeneity of slurry R may be quantitatively evaluated based on, for example, light transmittance obtained by a UV/visible light spectrometer or viscosity obtained by an E-type viscometer, or simply evaluated based on visual observation of uniformity in cloudiness. The time for a treatment by a disperser is preferably 0.5 to 6 minutes and more preferably 2 to 5 minutes. In slurry R thus treated, a cellulose nanofiber can keep a good dispersion state for a few days, and thus it is also possible to prepare slurry R in advance and stored.

It is preferable that the above slurry R is further subjected to wet classification in view of efficient removal of still aggregated cellulose nanofibers. For wet classification, a sieve and a commercially available wet classifier can be used. The opening size of the sieve varies depending upon the fiber length of the cellulose nanofiber to be used. The opening size is preferably around 50 μm in view of work efficiency.

Slurry S is obtained by mixing the above slurry Q and slurry R. The content of a cellulose nanofiber in slurry S is not particularly limited as long as the content in terms of carbon atom in the positive-electrode active material for a secondary cell of the present invention falls within the range of 0.3 to 6 mass %, specifically, the content in terms of residual amount in a carbonization treatment relative to an oxide (100 parts by mass) in slurry S is preferably 0.3 to 6.4 parts by mass, more preferably 0.4 to 3.1 parts by mass and further preferably 0.5 to 1.5 parts by mass. The mixing ratio of slurry Q and slurry R may be specified so as to satisfy such a ratio. The mixing order of slurry Q and slurry R is not particularly limited.

Step (II') is a step of subjecting slurry S obtained in step (I') to spray drying to obtain granule S. The particle size of granule S obtained by spray drying is preferably 1 to 15 μm and more preferably 3 to 10 μm in terms of the $D_{50}$ value obtained in a particle size distribution based on a laser diffraction/scattering method. The $D_{50}$ value obtained in a particle size distribution measurement is a value obtained by the particle size distribution on a volume basis based on the laser diffraction/scattering method. The $D_{50}$ value means a particle size (median diameter) at the accumulation of 50%. The particle size of granule S may be controlled by optimizing the operating conditions of the spray dryer.

Step (III') is a step of pyrolyzing the granule S obtained in step (II') in a reducing atmosphere or an inert atmosphere. By this step, a cellulose nanofiber present in granule S is carbonized into carbon, which is then firmly supported on an oxide represented by any one of formulas (A) to (C) to obtain a positive-electrode active material for a secondary cell. The pyrolyzing is preferably carried out in a reducing atmosphere or an inert atmosphere, at preferably 400° C. or more and more preferably 400 to 800° C., for preferably 10 minutes to 3 hours and more preferably 0.5 to 1.5 hours.

As a secondary cell, i.e., a lithium-ion secondary cell or sodium-ion secondary cell, to which a secondary-cell positive electrode containing the positive-electrode active material for a secondary cell of the present invention can be applied, is not particularly limited, as long as it contains a positive electrode, a negative electrode, the electrolyte and the separator as an essential constituent.

The negative electrode herein is not particularly limited by a material, as long as a lithium ion or a sodium ion is absorbed during charging and desorbed during discharging. A negative electrode constituted of a material known in the art can be used. Examples thereof include a lithium metal, a sodium metal and a carbon material such as graphite or amorphous carbon. An electrode formed of a material capable of electrochemically absorbing and desorbing a lithium ion or a sodium ion, i.e., a material having intercalation characteristic, in particular, formed of a carbon material, is preferably used.

The electrolyte is prepared by dissolving a supporting salt in an organic solvent. The organic solvent is not particularly limited as long as it can be conventionally used in an electrolyte of a lithium-ion secondary cell and a sodium-ion secondary cell. For example, a carbonate, a halogenated hydrocarbon, an ether, a ketone, a nitrile, a lactone and an oxolane compound may be used.

A type of the supporting salt is not particularly limited, and is preferably at least one of an inorganic salt selected from the group consisting of $LiPF_6$, $LiBF_4$, $LiClO_4$ and $LiAsF_6$, a derivative of the inorganic salt, an organic salt selected from the group consisting of $LiSO_3CF_3$, $LiC(SO_3CF_3)_2$ and $LiN(SO_3CF_3)_2$, $LiN(SO_2C_2F_5)_2$ and $LiN(SO_2CF_3)(SO_2C_4F_9)$ and a derivative of the organic salt, in the case of a lithium-ion secondary cell; and preferably at least one of an inorganic salt selected from the group consisting of $NaPF_6$, $NaBF_4$, $NaClO_4$ and $NaAsF_6$, a derivative of the inorganic salt, an organic salt selected from the group consist of $NaSO_3CF_3$, $NaC(SO_3CF_3)_2$, $NaN(SO_3CF_3)_2$, $NaN(SO_2C_2F_5)_2$ and $NaN(SO_2CF_3)(SO_2C_4F_9)$ and a derivative of the organic salt, in the case of a sodium-ion secondary cell.

The separator plays a role in electrically insulating the positive electrode and negative electrode and holding an electrolyte. For example, a porous membrane such as a porous synthetic resin film, in particular, a polyolefin-based polymer (polyethylene, polypropylene) may be used.

EXAMPLES

Hereinafter, the present invention will be more specifically described below based on Examples; however, the present invention is not limited by these Examples.

Note that, the amount of carbon obtained by carbonizing a cellulose nanofiber was determined by a non-dispersive infrared absorption method using a carbon/sulfur analyzer (EMIA-220V2, manufactured by Horiba, Ltd.).

Example 1-1

LiOH·H$_2$O (12.72 g), water (90 mL) and a cellulose nanofiber (also called as CNF, CELISH KY-100G manufactured by DAICEL FINECHEM LTD., fiber diameter: 4 to 100 nm) (10.19 g) were mixed to obtain slurry. Then, while the resultant slurry was stirred for 5 minutes with maintaining a temperature of 25° C., a 85% aqueous phosphoric acid solution (11.53 g) was added dropwise at a rate of 35 mL/minute and subsequently stirred for 12 hours at a speed of 400 rpm to obtain slurry containing composite X. The slurry contained lithium (2.97 moles) relative to phosphoric acid (1 mole).

Next, to the resultant slurry (34.4 g), FeSO$_4$·7H$_2$O (27.80 g) was added.

Then, the resultant mixture was placed in an autoclave and a hydrothermal reaction was carried out at 170° C. for one hour. The inner pressure of the autoclave was 0.8 MPa. A crystal obtained was filtered and then washed with water (12 parts by mass) relative to the crystal (1 part by mass). The crystal washed was subjected to freeze dry at −50° C. for 12 hours to obtain composite Y.

The composite Y obtained was pyrolyzed under an argon/hydrogen atmosphere (hydrogen concentration 3%) at 700° C. for one hour to obtain a positive-electrode active material (LiFePO$_4$, the amount of carbon=2.5 mass %) for a lithium-ion secondary cell, having carbon derived from a cellulose nanofiber supported.

Example 1-2

A positive-electrode active material (LiMnPO$_4$, the amount of carbon=2.5 mass %) for a lithium-ion secondary cell, having carbon derived from a cellulose nanofiber supported was obtained in the same manner as in Example 1-1 except that MnSO$_4$·5H$_2$O (24.11 g) was added instead of FeSO$_4$·7H$_2$O.

Example 1-3

A positive-electrode active material (LiFe$_{0.2}$Mn$_{0.8}$PO$_4$, the amount of carbon=2.5 mass %) for a lithium-ion secondary cell having carbon derived from a cellulose nanofiber supported was obtained in the same manner as in Example 1-1 except that MnSO$_4$·5H$_2$O (19.29 g) was further added in addition to FeSO$_4$·7H$_2$O (5.56 g).

Example 1-4

A positive-electrode active material (LiFe$_{0.1}$Mn$_{0.8}$Mg$_{0.1}$PO$_4$, the amount of carbon=2.5 mass %) for a lithium-ion secondary cell having carbon derived from a cellulose nanofiber supported was obtained in the same manner as in Example 1-1 except that MgSO$_4$·7H$_2$O (2.48 g) was further added in addition to FeSO$_4$·7H$_2$O (2.78 g).

Example 1-5

A positive-electrode active material (LiFe$_{0.1}$Mn$_{0.8}$Zr$_{0.05}$PO$_4$, the amount of carbon=2.5 mass %) for a lithium-ion secondary cell having carbon derived from a cellulose nanofiber supported was obtained in the same manner as in Example 1-1 except that ZrSO$_4$·4H$_2$O (1.81 g) was further added in addition to FeSO$_4$·7H$_2$O (2.78 g).

Example 1-6

A positive-electrode active material (LiFe$_{0.2}$Mn$_{0.8}$PO$_4$, the amount of carbon=4.7 mass %) for a lithium-ion secondary cell having carbon derived from a cellulose nanofiber supported was obtained in the same manner as in Example 1-1 except that the amount of cellulose nanofiber was specified as 16.99 g and MnSO$_4$·5H$_2$O (19.29 g) was further added in addition to FeSO$_4$·7H$_2$O (5.56 g).

Example 1-7

A positive-electrode active material (LiFe$_{0.2}$Mn$_{0.8}$PO$_4$, the amount of carbon=6.4 mass %) for a lithium-ion secondary cell, having carbon derived from a cellulose nanofiber supported was obtained in the same manner as in Example 1-1 except that the amount of cellulose nanofiber was specified as 23.78 g and MnSO$_4$·5H$_2$O (19.29 g) was further added in addition to FeSO$_4$·7H$_2$O (5.56 g).

Example 1-8

A positive-electrode active material (LiFe$_{0.2}$Mn$_{0.8}$PO$_4$, the amount of carbon=8.2 mass %) for a lithium-ion secondary cell having carbon derived from a cellulose nanofiber supported was obtained in the same manner as in Example 1-1 except that the amount of cellulose nanofiber was specified as 33.97 g.

Example 1-9

To LiOH·$H_2O$ (4.28 g) and $Na_4SiO_4$·$nH_2O$ (13.97 g), ultrapure water (37.5 mL) was added and mixed. To this aqueous dispersion solution, a cellulose nanofiber (14.57 g), $FeSO_4$·$7H_2O$ (3.92 g), $MnSO_4$·$5H_2O$ (7.93 g) and $Zr(SO_4)_2$·$4H_2O$ (0.53 g) were added and mixed.

Then, the resultant mixture was placed in an autoclave and a hydrothermal reaction was carried out at 150° C. for 12 hours. The pressure of the autoclave was 0.4 MPa. A crystal obtained was filtered and then washed with water (12 parts by mass) relative to the crystal (1 part by mass). The crystal washed was subjected to freeze dry at −50° C. for 12 hours to obtain composite Y.

The composite Y obtained was pyrolyzed under an argon/hydrogen atmosphere (hydrogen concentration 3%) at 700° C. for one hour to obtain a positive-electrode active material ($Li_2Fe_{0.09}Mn_{0.85}Zr_{0.03}SiO_4$, the amount of carbon=7.2 mass %) for a lithium-ion secondary cell having carbon derived from a cellulose nanofiber supported.

Example 1-10

NaOH (6.00 g), water (90 mL) and a cellulose nanofiber (5.10 g) were mixed to obtain slurry. Then, while the resultant slurry was stirred for 5 minutes with maintaining a temperature of 25° C., a 85% aqueous phosphoric acid solution (5.77 g) was added dropwise at a rate of 35 mL/minute and subsequently stirred for 12 hours at a speed of 400 rpm to obtain slurry containing composite X. The slurry contained sodium (3.00 moles) relative to phosphoric acid (1 mole).

To the resultant slurry, nitrogen gas was purged. After the concentration of dissolved oxygen was controlled to be 0.5 mg/L, $FeSO_4$·$7H_2O$ (1.39 g), $MnSO_4$·$5H_2O$ (9.64 g) and $MgSO_4$·$7H_2O$ (1.24 g) were added.

Then, the resultant mixture was placed in an autoclave purged with nitrogen gas and a hydrothermal reaction was carried out at 200° C. for 3 hours. The inner pressure of the autoclave was 1.4 MPa. A crystal obtained was filtered and then washed with water (12 parts by mass) relative to the crystal (1 part by mass). The crystal washed was subjected to freeze dry at −50° C. for 12 hours to obtain composite Y.

The composite Y obtained was pyrolyzed under an argon/hydrogen atmosphere (hydrogen concentration 3%) at 700° C. for one hour to obtain a positive-electrode active material ($NaFe_{0.1}Mn_{0.8}Mg_{0.1}PO_4$, the amount of carbon=2.4 mass %) for a sodium-ion secondary cell having carbon derived from a cellulose nanofiber supported.

Comparative Example 1-1

LiOH·$H_2O$ (12.72 g) and water (90 mL) were mixed to obtain slurry. Then, while the resultant slurry was stirred for 5 minutes with maintaining a temperature of 25° C., a 85% aqueous phosphoric acid solution (11.53 g) was added dropwise at a rate of 35 mL/minute and subsequently stirred for 12 hours at a speed of 400 rpm to obtain slurry.

Next, to the resultant slurry (114.3 g), $FeSO_4$·$7H_2O$ (27.8 g) was added.

Then, the resultant mixed solution was placed in an autoclave and a hydrothermal reaction was carried out at 170° C. for one hour. The inner pressure of the autoclave was 0.8 MPa. A crystal obtained was filtered and then washed with water (12 parts by mass) relative to the crystal (1 part by mass). The crystal washed was subjected to freeze dry at −50° C. for 12 hours to obtain a product.

The resultant product (2.00 g) and glucose (0.27 g) were mixed and placed in a container equipped with a planetary ball mill (P-5, manufactured by Fritsche Japan Co., Ltd.). To this, a solvent obtained by mixing ethanol (90 g) and water (10 mL) was added.

Then, pulverization was carried out by use of a $ZrO_2$ ball (100 g) having a diameter (1 mm), at a rotation speed of 400 rpm for one hour. The resultant slurry was filtered, and the solvent was distilled off by an evaporator. Calcination was carried out under an argon/hydrogen atmosphere (hydrogen concentration 3%) at 700° C. for one hour to obtain a positive-electrode active material ($LiFePO_4$, the amount of carbon=2.5 mass %) for a lithium-ion secondary cell having carbon derived from glucose supported.

Comparative Example 1-2

A positive-electrode active material ($LiMnPO_4$, the amount of carbon=2.5 mass %) for a lithium-ion secondary cell having carbon derived from a glucose supported was obtained in the same manner as in Comparative Example 1-1 except that $MnSO_4$·$5H_2O$ (24.11 g) was added instead of $FeSO_4$·$7H_2O$.

Comparative Example 1-3

A positive-electrode active material ($LiFe_{0.2}Mn_{0.2}PO_4$, the amount of carbon=2.5 mass %) for a lithium-ion secondary cell having carbon derived from glucose supported was obtained in the same manner as in Comparative Example 1-1 except that $MnSO_4$·$5H_2O$ (19.29 g) was further added in addition to $FeSO_4$·$7H_2O$ (5.56 g).

Comparative Example 1-4

A positive-electrode active material ($LiFe_{0.1}Mn_{0.8}Mg_{0.1}PO_4$, the amount of carbon=2.5 mass %) for a lithium-ion secondary cell having carbon derived from glucose supported was obtained in the same manner as in Comparative Example 1-1 except that $MgSO_4$·$7H_2O$ (2.48 g) was further added in addition to $FeSO_4$·$7H_2O$ (2.78 g).

Comparative Example 1-5

A positive-electrode active material ($LiFe_{0.1}Mn_{0.8}Zr_{0.05}PO_4$, the amount of carbon=2.5 mass %) for a lithium-ion secondary cell having carbon derived from glucose supported was obtained in the same manner as in Comparative Example 1-1 except that $ZrSO_4$·$4H_2O$ (1.81 g) was further added in addition to $FeSO_4$·$7H_2O$ (2.78 g).

Comparative Example 1-6

A positive-electrode active material ($LiFe_{0.2}Mn_{0.8}PO_4$, the amount of carbon=2.5 mass %) for a lithium-ion secondary cell having carbon derived from a cellulose nanotube supported was obtained in the same manner as in Example 1-3 except that 0.47 g of carbon nanotube (also called as CNT, a multi-layer carbon nanotube MWNT having a length of 4 μm and a diameter of 30 nm, manufactured by SWeNT) was added instead of the cellulose nanofiber of Example 1-1.

Comparative Example 1-7

A positive-electrode active material ($LiFe_{0.2}Mn_{0.8}PO_4$, the amount of carbon=2.5 mass %) for a lithium-ion secondary cell having carbon derived from a cellulose supported was obtained in the same manner as in Example 1-3 except that 1.06 g of cellulose (crystalline cellulose also called as CC, CEOLUS ST-100 having particle size of 50 µm, manufactured by Asahi Kasei Chemicals Corporation) was added instead of the cellulose nanofiber of Example 1-1.

<Carbon Analysis 1 by Raman Spectroscopy>

The positive-electrode active materials for a lithium-ion secondary cell obtained in Example 1-3, Comparative Example 1-6 and Comparative Example 1-7 were subjected to Raman spectral analysis using Raman spectrophotometer NRS-1000 (manufactured by JASCO Corporation). The intensity ratio (G/D) of D band and G band of the Raman spectrum obtained was 1.2 in Example 1-3, 2.1 in Comparative Example 1-6 and 1.2 in Comparative Example 1-7. An RBM peak was present in Comparative Example 1-6 and not present in Example 1-3. The intensity ratio ($PO_4/G$) was 0.05 in Example 1-3, 5.2 in Comparative Example 1-6 and 0.12 in Comparative Example 1-7.

The Raman spectra obtained in Example 1-3 and Comparative Example 1-7 are shown in FIG. 1, and the Raman spectrum obtained in Comparative Example 1-6 is shown in FIG. 2.

<Observation for State of Supported Carbon by Electronic Microscope>

The state of carbon supported in the positive-electrode active materials for a lithium secondary cell obtained in Example 1-3 and Comparative Example 1-3 was observed by a transmission electron microscope ARM200F (manufactured by JEOL Ltd.). In Example 1-3, carbon derived from a cellulose nanofiber is present on part of the surface of an oxide particle in the form of a mountain, while in Comparative Example 1-3, carbon derived from glucose uniformly coated the entire surface of an oxide particle. TEM photographs obtained are shown in FIG. 3 (Example 1-3: in FIG. 3, "LMP" represents $LiMn_{0.8}Fe_{0.2}PO_4$ particle and "C" represents carbon derived from a cellulose nanofiber), and in FIG. 4 (Comparative Example 1-3: in FIG. 4, "LMP" represents $LiMn_{0.8}Fe_{0.2}PO_4$ particle and "C" represents carbon derived from glucose).

Carbon derived from a cellulose nanofiber of the present invention is sterically present on the surface of an oxide particle, and fills the spaces between the oxide particles. Therefore, even if the entire surface of the particle is not uniformity coated, such carbon forms a satisfactory conductive path, and conceivably, greatly contributes to formation of an active material having a dense laminated structure.

<Evaluation 1 for Charge/Discharge Characteristics>

Using the positive-electrode active materials obtained in Examples 1-1 to 1-10 and Comparative Examples 1-1 to 1-7, a positive electrode of a lithium-ion secondary cell or a sodium-ion secondary cell was manufactured. Specifically, the obtained positive electrode active material, Ketjen black and polyvinylidene fluoride were mixed in a weight ratio of 75:15:10. To this mixture, N-methyl-2-pyrrolidone was added and the mixture was sufficiently kneaded to prepare positive electrode slurry. The positive electrode slurry was applied to a current collector formed of aluminum foil having a thickness of 20 µm by use of a coater and subjected to vacuum drying at 80° C. for 12 hours. Thereafter, the resultant was punched out into a disk of φ14 mm and pressed by use of a hand press at 16 MPa for 2 minutes to obtain a positive electrode.

Then, using the positive electrode, a coin-type secondary cell was constructed. As a negative electrode, lithium foil punched into a disk of φ15 mm was used. The electrolyte used herein was prepared by mixing ethylene carbonate and ethyl methyl carbonate in a volume ratio of 1:1 and dissolving, in the resultant mixed solvent, $LiPF_6$ at a concentration of 1 mol/L. The separator used herein was one known in the art such as a porous polymer film formed of e.g., polypropylene. These electric cell parts were assembled and housed under an atmosphere having a dew point of −50° C. or less by a conventional method to produce a coin-type secondary cell (CR-2032).

The secondary cell thus manufactured was subjected to a charge-discharge test at a constant current density. The cell was charged at a constant current of 0.1 CA (17 mAh/g) and a voltage of 4.5 V; and discharged at a constant current of 3 CA and a final voltage of 2.0 V. The temperature was 30° C. throughout the charge-discharge step.

Results of the discharged capacity are shown in Table 1.

TABLE 1

| | 3C Discharged capacity (mAh/g) | Amount of carbon supported (mass %) |
|---|---|---|
| Example 1-1 ($LiFePO_4$ + CNF) | 141 | 2.5 |
| Example 1-2 ($LiMnPO_4$ + CNF) | 98 | 2.5 |
| Example 1-3 ($LiFe_{0.2}Mn_{0.8}PO_4$ + CNF) | 130 | 2.5 |
| Example 1-4 ($LiFe_{0.1}Mn_{0.8}Mg_{0.1}PO_4$ + CNF) | 128 | 2.5 |
| Example 1-5 ($LiFe_{0.1}Mn_{0.8}Zr_{0.05}PO_4$ + CNF) | 127 | 2.5 |
| Example 1-6 ($LiFe_{0.2}Mn_{0.8}PO_4$ + CNF) | 136 | 4.7 |
| Example 1-7 ($LiFe_{0.2}Mn_{0.8}PO_4$ + CNF) | 130 | 6.4 |
| Example 1-8 ($LiFe_{0.2}Mn_{0.8}PO_4$ + CNF) | 107 | 8.2 |
| Example 1-9 ($Li_2Fe_{0.09}Mn_{0.85}Zr_{0.03}SiO_4$ + CNF) | 165 | 7.2 |
| Example 1-10 ($NaFe_{0.1}Mn_{0.8}Mg_{0.1}PO_4$ + CNF) | 103 | 2.4 |
| Comparative Example 1-1 ($LiFePO_4$/C) | 125 | 2.5 |
| Comparative Example 1-2 ($LiMnPO_4$/C) | 85 | 2.5 |
| Comparative Example 1-3 ($LiFe_{0.2}Mn_{0.8}PO_4$/C) | 115 | 2.5 |
| Comparative Example 1-4 ($LiFe_{0.1}Mn_{0.8}Mg_{0.1}PO_4$/C) | 109 | 2.5 |
| Comparative Example 1-5 ($LiFe_{0.1}Mn_{0.8}Zr_{0.05}PO_4$/C) | 109 | 2.5 |
| Comparative Example 1-6 ($LiFe_{0.2}Mn_{0.8}PO_4$ + CNT) | 5 | 2.5 |
| Comparative Example 1-7 ($LiFe_{0.2}Mn_{0.8}PO_4$ + CC) | 55 | 2.5 |

From the above results, it found that the positive-electrode active materials of Examples 1-1 to 1-10 having carbon derived from a cellulose nanofiber supported can exhibit excellent cell performance.

Synthesis Example 1

Synthesis of Oxide A

[Test Sample 1]

To $LiOH \cdot H_2O$ (1272 g), water (3000 mL) was mixed to obtain slurry. Then, while the resultant slurry was stirred for 5 minutes with maintaining a temperature of 25° C., a 85% aqueous phosphoric acid solution (1274 g) was added dropwise at a rate of 35 mL/minute and subsequently stirred for 12 hours at a speed of 400 rpm to obtain slurry containing $Li_3PO_4$.

To the resultant slurry, $FeSO_4 \cdot 7H_2O$ (813 g) and $MnSO_4 \cdot H_2O$ (1154 g) were added.

Then, the resultant mixed solution was placed in an autoclave and a hydrothermal reaction was carried out at 170° C. for one hour. The inner pressure of the autoclave was 0.8 MPa.

A crystal obtained was filtered and then washed with water (12 parts by mass) relative to the crystal (1 part by mass).

The crystal washed was subjected to freeze dry performed at −50° C. for 12 hours to obtain oxide A ($LiFe_{0.3}Mn_{0.7}PO_4$)

Synthesis Example 2

Synthesis of Oxide B

Oxide B ($LiFe_{0.9}Mn_{0.1}PO_4$) was obtained in the same manner as in positive-electrode material A described above except that the amount of $FeSO_4 \cdot 7H_2O$ to be added was changed to 2440 g and further the amount of $MnSO_4 \cdot H_2O$ was changed to 165 g.

Synthesis Example 3

Synthesis of Oxide C

To $LiOH \cdot H_2O$ (428 g) and $Na_4SiO_4 \cdot nH_2O$ (1397 g), water (3750 mL) was added. Then, to the resultant slurry, $FeSO_4 \cdot 7H_2O$ (392 g), $MnSO_4 \cdot 5H_2O$ (793 g) and $Zr(SO_4)_2 \cdot 4H_2O$ (53 g) were added and mixed.

Then, the resultant mixed solution was placed in an autoclave and a hydrothermal reaction was carried out at 150° C. for 12 hours. The pressure of the autoclave was 0.4 MPa.

A crystal obtained was filtered and then washed with water (12 parts by mass) relative to the crystal (1 part by mass).

The crystal washed was subjected to freeze dry performed at −50° C. for 12 hours to obtain oxide C ($Li_2Fe_{0.09}Mn_{0.85}Zr_{0.03}SiO_4$).

Synthesis Example 4

Synthesis of Oxide D

To NaOH (600 g), water (9000 mL) was mixed to obtain an aqueous solution. While the resultant slurry was stirred for 5 minutes with maintaining a temperature of 25° C., a 85% aqueous phosphoric acid solution (577 g) was added dropwise at a rate of 35 mL/minute and subsequently stirred for 12 hours at a speed of 400 rpm to obtain slurry containing $Na_3PO_4$.

To the resultant slurry, nitrogen gas was purged to control the concentration of dissolved oxygen to be 0.5 mg/L, and thereafter, $FeSO_4 \cdot 7H_2O$ (139 g), $MnSO_4 \cdot 5H_2O$ (964 g) and $MgSO_4 \cdot 7H_2O$ (124 g) were added.

Then, the resultant mixed solution was placed in an autoclave purged with nitrogen gas and a hydrothermal reaction was carried out at 200° C. for 3 hours. The inner pressure of the autoclave was 1.4 MPa. A crystal obtained was filtered and washed with water (12 parts by mass) relative to the crystal (1 part by mass).

The crystal washed was subjected to freeze dry performed at −50° C. for 12 hours to obtain oxide D ($NaFe_{0.1}Mn_{0.8}Mg_{0.1}PO_4$).

Preparation Example 1

Preparation of Slurry $Q_A$

To oxide A ($LiFe_{0.3}Mn_{0.7}PO_4$) described above (1000 g), water (1220 mL) was mixed. Then, the resultant mixed solution was subjected to a dispersion treatment using an ultrasonic stirrer (T25, manufactured by IKA) for one minute to obtain slurry $Q_A$ entirely and uniformity colored.

Preparation Example 2

Preparation of slurry $Q_B$

Slurry $Q_B$ containing oxide B and water was obtained in the same manner as in Preparation Example 1 except that oxide B ($LiFe_{0.9}Mn_{0.1}PO_4$) was used instead of oxide A.

Preparation Example 3

Preparation of Slurry $Q_C$

Slurry $Q_C$ containing oxide C and water was obtained in the same manner as in Preparation Example 1 except that oxide C ($Li_2Fe_{0.09}Mn_{0.85}Zr_{0.03}SiO_4$) was used instead of oxide A.

Preparation Example 4

Preparation of Slurry $Q_D$

Slurry $Q_D$ containing oxide D and water was obtained in the same manner as in Preparation Example 1 except that oxide D ($NaFe_{0.1}Mn_{0.8}Mg_{0.1}PO_4$) was used instead of oxide A.

Preparation Example 5

Preparation of slurry R

To 1119.4 g of a cellulose nanofiber (CELISH FD-200L, manufactured by DAICEL FINECHEM LTD., average fiber diameter 10 to 100 nm), water (1250 mL) was mixed. Then, the resultant mixed solution was subjected to a dispersion treatment by an ultrasonic stirrer (T25, manufactured by IKA) for five minutes to obtain slurry R entirely and uniformly clouded. Thereafter, the resultant slurry R was passed through a sieve having an opening of 150 μm to obtain slurry R having a cellulose nanofiber dispersed therein. Note that, no residue on sieve was observed in the above sieving.

Preparation Example 6

Preparation of Glucose Solution

To 500 g of glucose (reagent grade, manufactured by Wako Pure Chemical Industries Ltd.), water (333.3 mL) was mixed to obtain glucose solution F.

Example 2-1

To slurry $Q_A$ (222.2 g), slurry R (11.85 g) was mixed to obtain slurry $S_G$, in which a cellulose nanofiber (0.5 parts by mass in terms of carbon) was contained relative to 100 parts by mass of oxide A ($LiFe_{0.3}Mn_{0.7}PO_4$).

The slurry $S_G$ obtained was subjected to spray drying (MDL-050M, manufactured by fujisaki electric Co. LTD.) to obtain granule $S_G$. The $D_{50}$ value of granule $S_G$ was measured by a particle size distribution measurement apparatus (Microtrac X100, manufactured by Nikkiso Co., Ltd.). The $D_{50}$ value was 7 μm.

The granule $S_G$ obtained was pyrolyzed under an argon/hydrogen atmosphere (hydrogen concentration 3%) at 700° C. for one hour to obtain a positive-electrode active material for a lithium-ion secondary cell ($LiFe_{0.3}Mn_{0.7}PO_4$, the amount of carbon=0.3 mass %) having carbon derived from a cellulose nanofiber supported.

Example 2-2

Slurry $S_H$, in which a cellulose nanofiber (1 part by mass in terms of carbon) was contained relative to 100 parts by mass of oxide A ($LiFe_{0.3}Mn_{0.7}PO_4$), was obtained in the same manner as in Example 1-1, except that slurry R (23.69 g) was mixed to slurry $Q_A$ (222.2 g).

Then, granule $S_H$ was obtained from slurry $S_H$ and then pyrolyzed in the same manner as in Example 2-1, to obtain a positive-electrode active material for a lithium-ion secondary cell ($LiFe_{0.3}Mn_{0.7}PO_4$, the amount of carbon=0.5 mass %) having carbon derived from a cellulose nanofiber supported.

Example 2-3

Slurry $S_I$, in which a cellulose nanofiber (1.5 parts by mass in terms of carbon) was contained relative to 100 parts by mass of oxide A ($LiFe_{0.3}Mn_{0.7}PO_4$), was obtained in the same manner as in Example 2-1, except that slurry R (35.54 g) was mixed to slurry $Q_A$ (222.2 g).

Then, granule $S_I$ was obtained from slurry $S_I$ and then pyrolyzed in the same manner as in Example 2-1 to obtain a positive-electrode active material for a lithium-ion secondary cell ($LiFe_{0.3}Mn_{0.7}PO_4$, the amount of carbon=0.8 mass %) having carbon derived from a cellulose nanofiber supported.

Example 2-4

Slurry $S_J$, in which a cellulose nanofiber (2 parts by mass in terms of carbon) was contained relative to 100 parts by mass of oxide A ($LiFe_{0.3}Mn_{0.7}PO_4$), was obtained in the same manner as in Example 2-1, except that slurry R (47.38 g) was mixed to slurry $Q_A$ (222.2 g).

Then, granule $S_J$ was obtained from slurry $S_J$ and then pyrolyzed in the same manner as in Example 2-1 to obtain a positive-electrode active material for a lithium-ion secondary cell ($LiFe_{0.3}Mn_{0.7}PO_4$, the amount of carbon=1.1 mass %) having carbon derived from a cellulose nanofiber supported.

Example 2-5

Slurry $S_K$, in which a cellulose nanofiber (10 parts by mass in terms of carbon) was contained relative to 100 parts by mass of oxide A ($LiFe_{0.3}Mn_{0.7}PO_4$), was obtained in the same manner as in Example 2-1, except that slurry R (236.9 g) was mixed to slurry $Q_A$ (222.2 g).

Then, granule $S_K$ was obtained from slurry $S_K$ and then pyrolyzed in the same manner as in Example 2-1 to obtain a positive-electrode active material for a lithium-ion secondary cell ($LiFe_{0.3}Mn_{0.7}PO_4$, the amount of carbon=4.9 mass %) having carbon derived from a cellulose nanofiber supported.

Example 2-6

Slurry $S_L$, in which a cellulose nanofiber (2 parts by mass in terms of carbon) was contained relative to 100 parts by mass of oxide B ($LiFe_{0.9}Mn_{0.1}PO_4$), was obtained in the same manner as in Example 2-1, except that slurry R (47.38 g) was mixed to slurry $Q_B$ (222.2 g).

Then, granule $S_L$ was obtained from slurry $S_L$ and then pyrolyzed in the same manner as in Example 2-1 to obtain a positive-electrode active material for a lithium-ion secondary cell ($LiFe_{0.9}Mn_{0.1}PO_4$, the amount of carbon=1.0 mass %) having carbon derived from a cellulose nanofiber supported.

Example 2-7

Slurry $S_M$, in which a cellulose nanofiber (2 parts by mass in terms of carbon) was contained relative to 100 parts by mass of oxide C ($Li_2Fe_{0.09}Mn_{0.85}Zr_{0.03}SiO_4$) was obtained in the same manner as in Example 2-1, except that slurry R (47.38 g) was mixed to slurry $Q_C$ (222.2 g).

Then, granule $S_M$ was obtained from slurry $S_M$ and then pyrolyzed in the same manner as in Example 2-1 to obtain a positive-electrode active material for a lithium-ion secondary cell ($Li_2Fe_{0.09}Mn_{0.85}Zr_{0.03}SiO_4$, the amount of carbon=1.1 mass %) having carbon derived from a cellulose nanofiber supported.

Example 2-8

Slurry $S_N$, in which a cellulose nanofiber (2 parts by mass in terms of carbon) was contained relative to 100 parts by mass of oxide D ($NaFe_{0.1}Mn_{0.8}Mg_{0.1}PO_4$) was obtained in the same manner as in Example 2-1, except that slurry R (47.38 g) was mixed to slurry $Q_D$ (222.2 g).

Then, granule $S_N$ was obtained from slurry $S_N$ and then pyrolyzed in the same manner as in Example 2-1 to obtain a positive-electrode active material for a sodium-ion secondary cell ($NaFe_{0.1}Mn_{0.8}Mg_{0.1}PO_4$, the amount of carbon=0.9 mass %) having carbon derived from a cellulose nanofiber supported.

Comparative Example 2-1

Slurry $S_O$, in which a cellulose nanofiber (0.4 parts by mass in terms of carbon) was contained relative to 100 parts by mass of oxide A ($LiFe_{0.3}Mn_{0.7}PO_4$), was obtained in the same manner as in Example 2-1, except that slurry R (9.476 g) was mixed to slurry $Q_A$ (222.2 g).

Then, granule $S_O$ was obtained from slurry $S_O$ and then pyrolyzed in the same manner as in Example 2-1 to obtain a positive-electrode active material for a lithium-ion secondary cell ($LiFe_{0.3}Mn_{0.7}PO_4$, the amount of carbon=0.2 mass %) having carbon derived from a cellulose nanofiber supported.

Comparative Example 2-2

Slurry $S_P$, in which glucose (1 part by mass in terms of carbon) was contained relative to 100 parts by mass of oxide A ($LiFe_{0.3}Mn_{0.7}PO_4$) was obtained in the same manner as in Example 2-1, except that glucose solution F (4.17 g) was added instead of slurry R, to slurry $Q_A$ (222.2 g).

Then, granule S_P was obtained from slurry S_P and then pyrolyzed in the same manner as in Example 2-1 to obtain a positive-electrode active material for a lithium-ion secondary cell (LiFe$_{0.3}$Mn$_{0.7}$PO$_4$, the amount of carbon=0.6 mass %) having carbon derived from glucose supported.

Comparative Example 2-3

Slurry S$_Q$, in which glucose (2 parts by mass in terms of carbon) was contained relative to 100 parts by mass of oxide A (LiFe$_{0.3}$Mn$_{0.7}$PO$_4$), was obtained in the same manner as in Example 2-1, except that glucose solution F (8.33 g) was mixed instead of slurry R, to slurry Q$_A$ (222.2 g).

Then, granule S$_Q$ was obtained from slurry S$_Q$ and then pyrolyzed in the same manner as in Example 2-1 to obtain a positive-electrode active material for a lithium-ion secondary cell (LiFe$_{0.3}$Mn$_{0.7}$PO$_4$, the amount of carbon=1.1 mass %) having carbon derived from glucose supported.

<Carbon Analysis 2 by Raman Spectroscopy>

The positive-electrode active material for a lithium-ion secondary cell obtained in Example 2-3 was subjected to Raman spectral analysis using a Raman spectrophotometer (NRS-1000, manufactured by JASCO Corporation). The intensity ratio of G band and D band (G/D) of the Raman spectrum obtained was 1.1. An RBM peak was not present. The intensity ratio (PO$_4$/G) of the peak attributed to PO$_4^{3-}$ (peak position: near 950 cm$^{-1}$) and G band was 0.03.

The Raman spectrum obtained is shown in FIG. 5.

<Evaluation 2 of Charge/Discharge Characteristics>

Using the positive-electrode active materials obtained in Examples 2-1 to 2-8 and Comparative Examples 2-1 to 2-3, a coin-type secondary cell (CR-2032) was manufactured in the same manner as in Evaluation 1 for charge/discharge characteristics, and a charge-discharge test was carried out in the same charging conditions.

Table 2 shows results of the discharged capacity together with the amounts of carbon supported on positive-electrode active materials.

TABLE 2

| | 3C Discharged capacity (mAh/g) | Amount of carbon supported (mass %) |
|---|---|---|
| Example 2-1 (LiFe$_{0.3}$Mn$_{0.7}$PO$_4$ + CNF) | 108 | 0.3 |
| Example 2-2 (LiFe$_{0.3}$Mn$_{0.7}$PO$_4$ + CNF) | 130 | 0.5 |
| Example 2-3 (LiFe$_{0.3}$Mn$_{0.7}$PO$_4$ + CNF) | 136 | 0.8 |
| Example 2-4 (LiFe$_{0.3}$Mn$_{0.7}$PO$_4$ + CNF) | 135 | 1.1 |
| Example 2-5 (LiFe$_{0.3}$Mn$_{0.7}$PO$_4$ + CNF) | 123 | 4.9 |
| Example 2-6 (LiFe$_{0.9}$Mn$_{0.1}$PO$_4$ + CNF) | 132 | 1.0 |
| Example 2-7 (Li$_2$Fe$_{0.09}$Mn$_{0.85}$Zr$_{0.03}$SiO$_4$ + CNF) | 160 | 1.1 |
| Example 2-8 (NaFe$_{0.1}$Mn$_{0.8}$Mg$_{0.1}$PO$_4$ + CNF) | 101 | 0.9 |
| Comparative Example 2-1 (LiFe$_{0.3}$Mn$_{0.7}$PO$_4$ + CNF) | 22 | 0.2 |
| Comparative Example 2-2 (LiFe$_{0.3}$Mn$_{0.7}$PO$_4$/C) | 31 | 0.6 |
| Comparative Example 2-3 (LiFe$_{0.3}$Mn$_{0.7}$PO$_4$/C) | 59 | 1.1 |

From the above results, it found that the positive-electrode active materials of Examples 2-1 to 2-8 having carbon derived from a cellulose nanofiber supported thereon exerts excellent electric cell performance although the amount of carbon supported is low.

The invention claimed is:

1. A positive-electrode active material for a secondary cell, comprising a compound particle represented by the following formula (B):

$$\text{Li}_2\text{Fe}_a\text{Mn}_b\text{M}_c\text{SiO}_4 \tag{B}$$

wherein in formula (B), M represents Mg, Ca, Sr, Y, Zr, Mo, Ba, Pb, Bi, La, Ce, Nd or Gd; a, b and c represent numbers satisfying 0≤a≤1, 0≤b≤1 and 0<c≤0.3, a and b are not simultaneously 0, and 2a+2b+(valence of M)×c=2 is satisfied; and carbon, wherein the carbon is derived from a cellulose nanofiber and is supported on the compound particle, wherein an amount of the carbon derived from the cellulose nanofiber and supported on the compound particle is from 0.3 to 6 mass %, and the positive-electrode active material is a product obtained by pyrolyzing a granule S comprising the compound particle and the cellulose nanofiber and having a particle size (D$_{50}$ value) of 1 to 15 µm.

2. The positive-electrode active material for a secondary cell according to claim 1, wherein, in a Raman spectrum, an intensity ratio (G/D) of D band and G band is 0.5 to 1.8; or an intensity ratio (SiO$_4$/G) of the peak attributed to SiO$_4^{4-}$ and G band is 0.01 to 0.10 and no radial breathing mode (RBM) peak is present.

3. The positive-electrode active material for a secondary cell according to claim 1, wherein the granule S is a granulated material of a compound particle, wherein the compound particle is a product of a synthetic reaction of a lithium compound or a sodium compound, a phosphoric acid compound or a silicic acid compound and a metal salt comprising at least an iron compound or a manganese compound, and the cellulose nanofiber.

4. The positive-electrode active material for a secondary cell according to claim 1, wherein in formula (B), a, b and c represent numbers satisfying 0.1≤a≤0.6, 0.1≤b≤0.6 and 0<c≤0.3.

5. The positive-electrode active material for a secondary cell according to claim 1, wherein the formula (B) is Li$_2$Fe$_{0.09}$Mn$_{0.85}$Zr$_{0.03}$SiO$_4$.

6. The positive-electrode active material for a secondary cell according to claim 1, wherein an amount of the carbon derived from the cellulose nanofiber and supported on the compound particle is from 0.5 to 5 mass %.

7. A method for manufacturing a positive-electrode active material for a secondary cell, comprising a compound particle represented by the following formula, (B)

$$\text{Li}_2\text{Fe}_a\text{Mn}_b\text{M}_c\text{SiO}_4 \tag{B}$$

wherein in formula (B) M represents Mg, Ca, Sr, Y, Zr, Mo, Ba, Pb, Bi, La, Ce, Nd or Gd; a, b and c represent numbers satisfying 0≤a≤1, 0≤b≤1 and 0<c≤0.3, a and b are not simultaneously 0, and 2a+2b+(valence of M)×c=2 is satisfied; and carbon, wherein the carbon is derived from a cellulose nanofiber supported on the compound particle, wherein an amount of the carbon derived from the cellulose nanofiber and supported on the compound particle is from 0.3 to 6 mass %, and the positive-electrode active material is a product obtained by pyrolyzing a granule S comprising the compound particle and the cellulose nanofiber and having a particle size (D$_{50}$ value) of 1 to 15 µm, the method comprising mixing slimy Q comprising a compound particle obtained by a synthetic reaction with slurry R comprising a cellulose nanofiber, to obtain slurry S, subjecting the slurry S obtained to spray drying to obtain granule S, and pyrolyzing the granule S obtained under a reducing atmosphere or an inert atmosphere.

* * * * *